United States Patent
van den Wildenberg (12)

(10) Patent No.: US 6,234,204 B1
(45) Date of Patent: May 22, 2001

(54) FLOW CONTROL VALVE

(76) Inventor: Adrianus Martinus van den Wildenberg, Beekstraat 39 E, Nuenen (NL), 5673 NA ( * ) Notice: Subject to any disclaimer, the term of this patent is extended or adjusted under 35 U.S.C. 154(b) by 0 days.

(21) Appl. No.: 09/348,734

(22) Filed: Jul. 6, 1999

Related U.S. Application Data

(63) Continuation of application No. 08/860,640, filed as application No. PCT/NL95/00449 on Dec. 29, 1995, now abandoned.

(30) Foreign Application Priority Data

Dec. 29, 1994 (NL) .................................................. 9402237

(51) Int. Cl.⁷ .................................................. E03B 23/16
(52) U.S. Cl. .................................... 137/599.07; 123/472
(58) Field of Search .................................. 137/599, 601, 137/599.07; 123/472, 527

(56) References Cited

U.S. PATENT DOCUMENTS

| | | | |
|---|---|---|---|
| 3,038,449 | * | 6/1962 | Murphy et al. ...................... 137/599 |
| 4,248,263 | * | 2/1981 | Langill et al. ........................ 137/599 |
| 4,768,544 | * | 9/1988 | Beam et al. .......................... 137/599 |
| 5,150,690 | * | 9/1992 | Carter et al. ......................... 137/599 |
| 5,329,965 | * | 7/1994 | Gordon ................................. 137/599 |

FOREIGN PATENT DOCUMENTS

| | | |
|---|---|---|
| 0 420 599 | 4/1991 | (EP) . |
| 2 163 275 | 7/1973 | (FR) . |

* cited by examiner

*Primary Examiner*—Stephen M. Hepperle
(74) *Attorney, Agent, or Firm*—Kinney & Lange P.A.

(57) ABSTRACT

A flow control valve has a supply line connection, and at least one discharge line connection, and is characterized by at least one fine-control valve whose flow rate is continuously or semicontinuously variable and at least one two-position valve having a minimum flow rate in one stable position and a maximum flow rate in another stable position. The inlet of the or each tow-position valve and the or each fine-control valve is in fluid communication with the supply line connection, and the outlet of the or each two-position valve and the or each fine-control valve is in fluid communication with the or each discharge line connection. In accordance with a further elaboration, the flow control valve may comprise a series of two-position valves, with the maximum flow rate of the successive two-position valves in the series doubling in each case, and the minimum flow rate of each two-position valve being zero.

14 Claims, 3 Drawing Sheets

FLOW CONTROL VALVE

CROSS REFERENCE TO RELATED APPLICATION(S)

This is a continuation of application Ser. No. 08/860,640, filed Jun. 26, 1997, which was a national phase of PCT/NL95/00449 filed Dec. 29, 1995 now abandon.

The invention relates to a flow control valve according to the preamble of claim 1.

With the known flow control valves, the flow rate is typically controlled through enlarging and reducing an orifice, such as is for instance the case with a needle valve. Such flow control valves have the advantage that the flow rate can be varied thereby in an accurate and stepless manner. However, the drawback of such a continuously controllable or analogous valves is that when a large control range is required, the accuracy of the control decreases substantially. Another drawback of continuously controllable or analogous valves is that the speed at which the flow rate can be varied is limited. In order that sufficient speed of control is nevertheless realized with continuously controllable valves, very heavy and/or sophisticated valve driving means are necessary, which render the valve costly. The above drawbacks are typical for continuously controllable valves of a large control range.

So-called two-position valves or bistable valves do not have these drawbacks. Generally, the two-position valves have in one position a maximum flow rate $Q_{max}$ and in the other position a minimum flow rate $Q_{min}$, usually zero. To bring the valve body from one position into the other position, simple valve driving means will suffice, which only need to bring the valve body from one stable position into the other stable position. This is in contrast to the valve driving means of the continuously controllable valve which should also be capable of fixing the valve body in each intermediate position. Moreover, with bistable or two-position valves, a flow rate of any magnitude can be selected without this having an essential influence on the speed at which the valve can be opened and closed. Hence, the 'control range' of such a valve can be chosen to be very large, however the accuracy of the control is minimal, as the valve is open or closed.

The object of the invention is to provide a flow control valve whose flow rate can be controlled with great speed and accuracy, and which can be manufactured in an economical manner.

To this end, the flow control valve of the type mentioned in the preamble is characterized by the features of the characterizing part of claim 1.

With such a flow control valve, the advantages of the continuously controllable valve of a small control range, i.e. a high control accuracy, are combined with the advantages of the two-position valve, i.e. a large 'control range' with a high control speed.

The control range of the flow control valve can be rendered as large as possible with a minimum number of two-position valves if the flow control valve has the characterizing features of claim 2.

When different two-position valves of the series are each indicated by a serial number i and when the maximum flow rate of the two-position valve of the smallest maximum flow rate is indicated by $Q_1$, then the maximum flow rate of the other two-position valves in the series meets the following formula:

$$Q_i = 2^{(i-1)} * Q_1$$

Accordingly, the flow rate of the first 6 valves of the series is: $Q_1$, $2Q_1$, $4Q_1$, $8Q_1$, $16Q_1$, $32Q_1$. Hence, the flow rate of the two-position valve increments according to a binary series, so that combining different valve positions of, for instance, six valves, enables variation in a flow control range of from 0 to $63Q_1$ with a step magnitude of $Q_1$.

When the flow control valve according to claim 2 also possesses the features of claim 3 and hence has a fine-control valve of which the difference between the minimum and the maximum flow rate is at least $Q_1$, then the flow rate of the flow control valve can be varied continuously in a highly accurate manner in a control range which ranges from the minimum flow rate of the fine-control valve to $63Q_1$ plus the maximum flow rate of the fine-control valve.

In accordance with claim 4, the minimum flow rate of the fine-control valve of the flow control valve can be zero, as a consequence of which the flow control valve can also act as a shut-off valve. In the above example, this results in a flow control valve having a control range of from 0 to $64Q_1$.

In accordance with an alternative embodiment of the flow control valve, the fine-control valve can be designed as indicated in claim 5. The control range of the fine-control valve can for instance be from $0.5Q_1$ to $1.5Q_1$. This offers the advantage that the fine-control valve need not close off completely. Thus, accurate fits are avoided and mechanical wear is practically ruled out. Moroever, the system becomes less sensitive to contaminations in the fluid of which the flow rate is to be controlled. In the above example, a flow control valve having a thus designed fine-control valve would have a control range of from $0.5Q_1$ to $64.5Q_1$.

Further elaborations of the flow control valve according to the invention are described in the subclaims and are further explained hereinbelow, with reference to the accompanying drawing, wherein:

Figure 1:
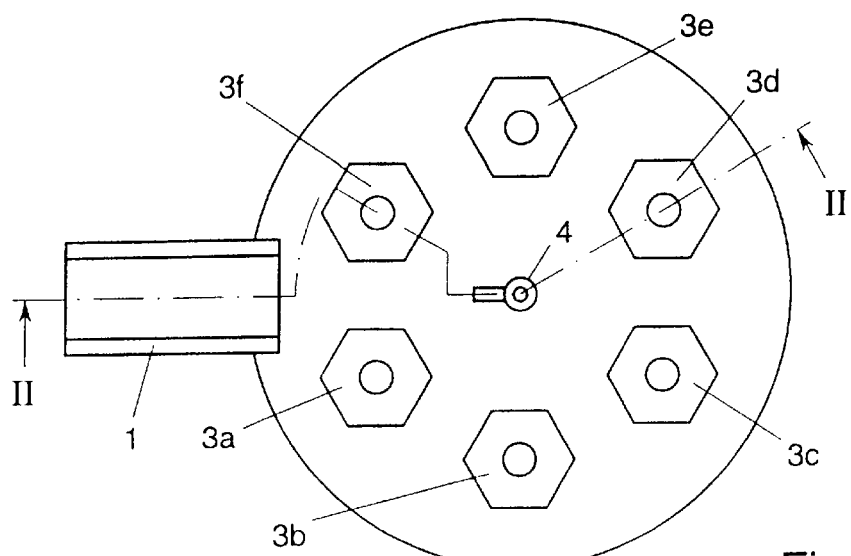
FIG. 1 is a top plan view of an exemplary embodiment of the flow control valve according to the invention.
Figure 2:
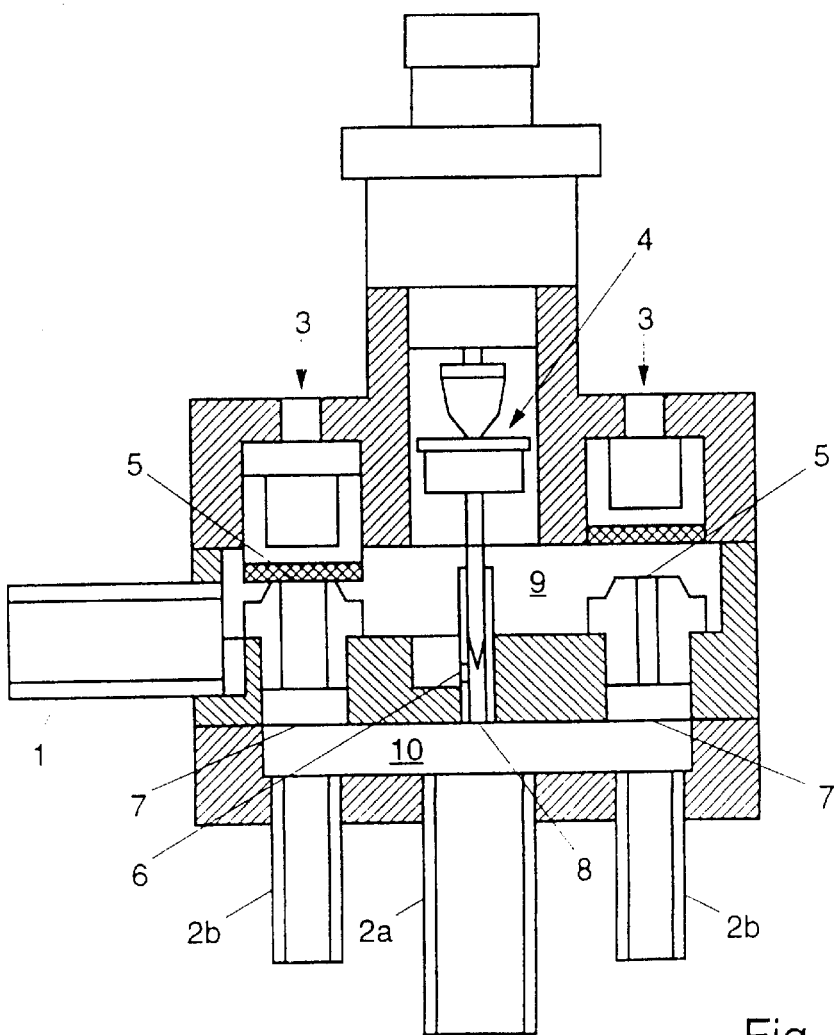
FIG. 2 is a sectional view taken on the line II—II of FIG. 1.
Figure 2A:
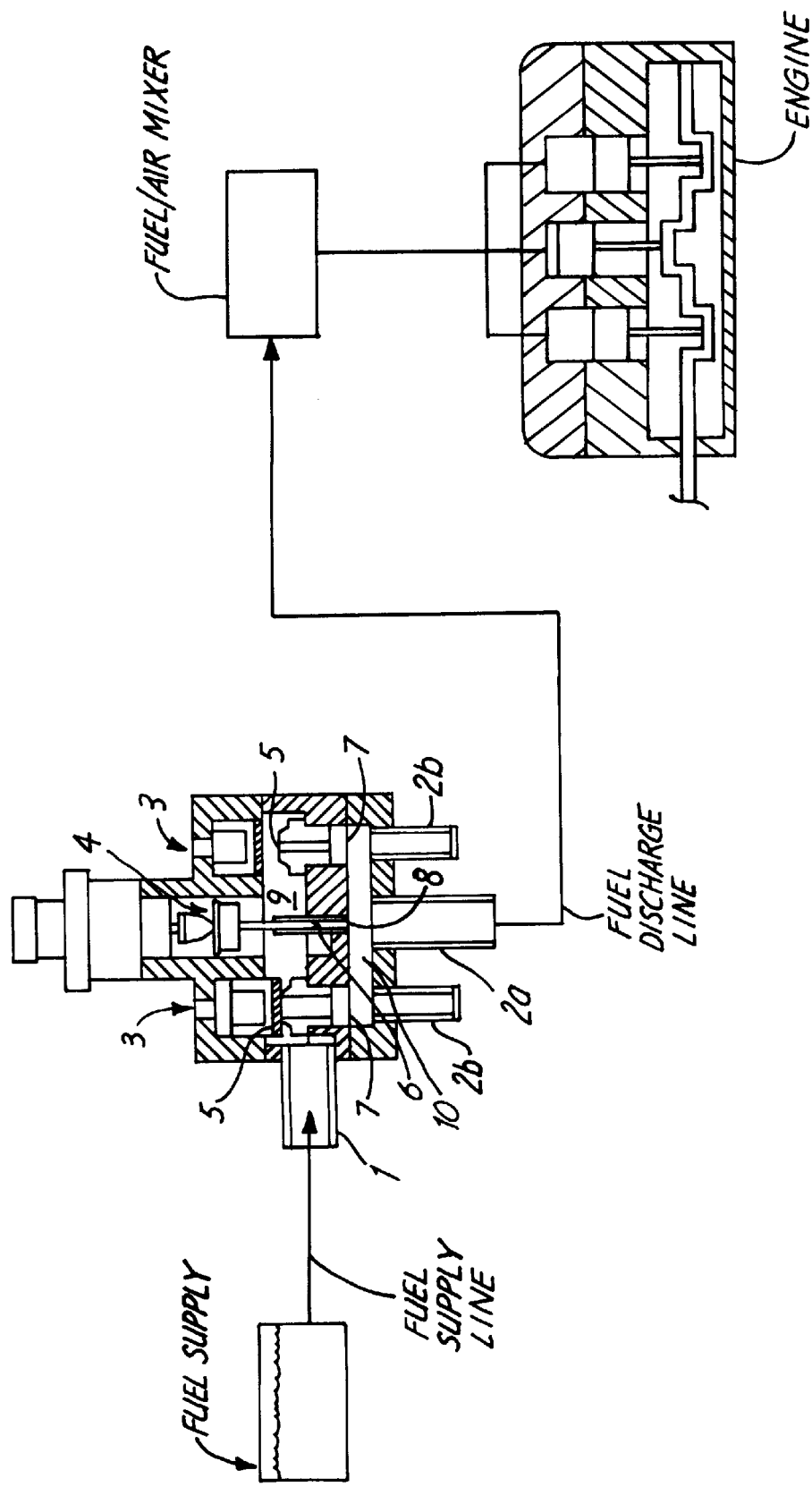
FIGS. 2a and 2b are exemplary views showing the embodiment of FIGS. 1 and 2 in an internal combustion engine.
Figure 2B:
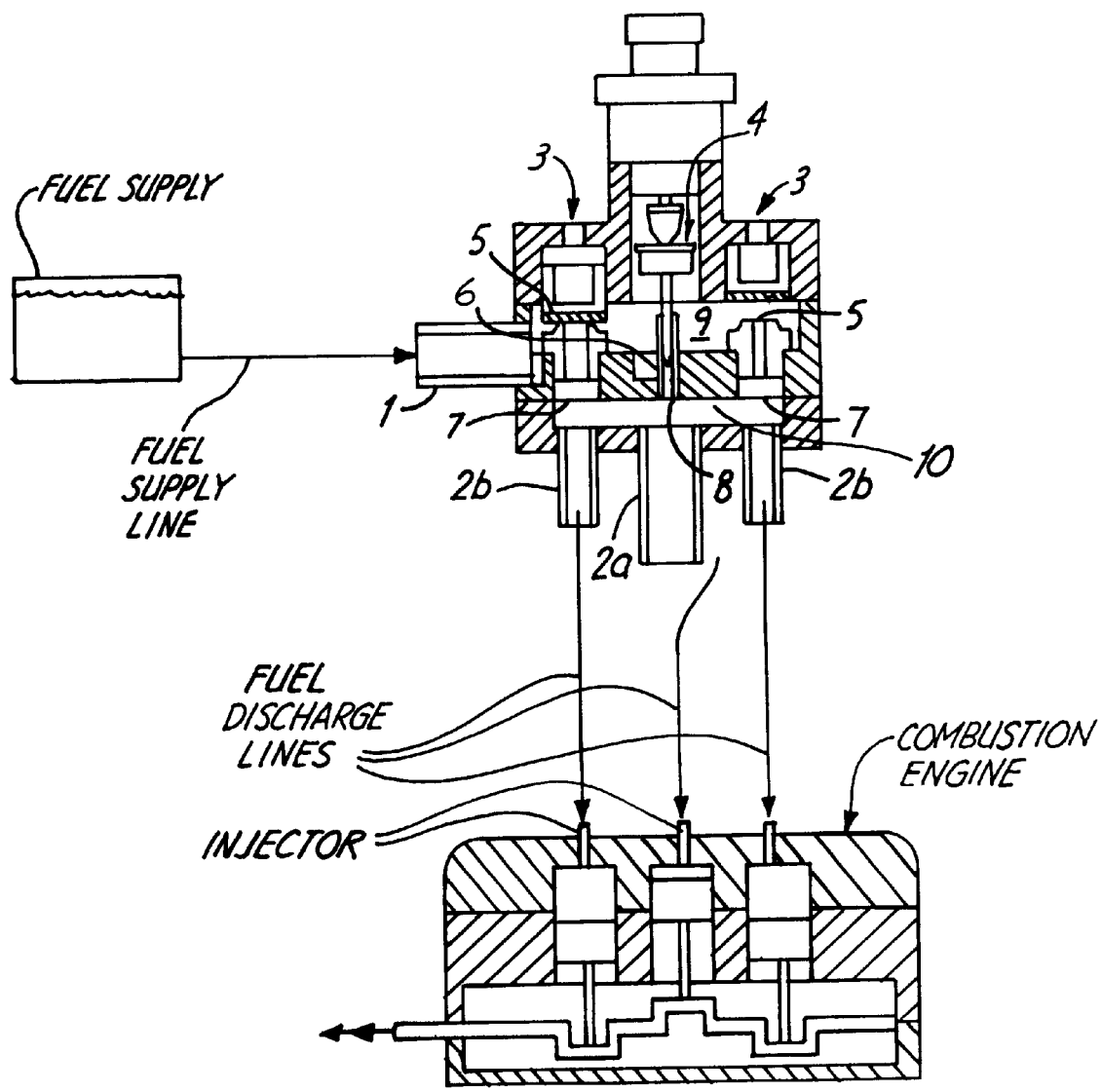

The drawing shows an embodiment of a flow control valve for, for instance, a fuel supply system of an internal combustion engine. The flow control valve comprises a supply line connection 1 and a number of discharge line connections 2a, 2b. Hence, the flow control valve can be connected both to a single discharge line 2a, for instance leading to a single fuel/air mixer (not shown), and to a number of discharge lines 2b, for instance leading to the inlet valves of the combustion engine cylinders.

Characteristic of the flow control valve is that it comprises at least one fine-control valve 4, of which the flow rate is continuously or semicontinuously variable, and at least one two-position valve 3, having a minimum flow rate in one stable position and a maximum flow rate in another stable position. The inlet 5, 6 of the or each two-position valve 3 and of the or each fine-control valve 4 is in fluid communication with the supply line connection 1, and the outlet 7, 8 of the or each two-position valve 3 and the or each fine-control valve 4 is in fluid communication with the or each discharge line connection 2a, 2b.

The flow control valve according to the invention is suitable for processing different types of fluids. By means of the flow control valve, the flow rate of both gaseous fluids and fluids in the liquid phase can be controlled in an excellent manner.

In the exemplary embodiment shown, the supply line connection 1 debouches into an inlet chamber 9 into which the inlet 5 of each two-position valve 3 and the inlet 6 of the fine-control valve 4 debouch as well. The or each discharge line connection 2a, 2b is connected to an outlet chamber 10 to which the outlet 7 of each two-position valve 3 and the outlet 8 of the fine-control valve 4 debouch as well.

The flow control valve in the exemplary embodiment shown comprises a series of six two-position valves 3a–3f, with the maximum flow rate of the successive two-position valves 3a–3f in the series doubling in each case. The minimum flow rate of the two-position valves 3a–3f used in the exemplary embodiment is zero. It is understood that the minimum flow rate of the two-position valves 3a–3f may also be greater than zero. This has as a consequence that when all two-position valves are in the position wherein the minimum flow rate is passed, the flow control valve still passes fluid. In that case, the flow control valve cannot act as a shut-off valve. However, the advantage is that the fits of the two-position valves 3 need not be accurately processed and that the two-position valves will hardly be subject to wear.

The exemplary embodiment shown comprises one fine-control valve of which the difference between the minimum and the maximum flow rate is at least as great as the difference in flow rate between the minimum and the maximum flow rate of that two-position valve of which that difference is smallest. In the present exemplary embodiment, this is the two-position valve 3a having the smallest maximum flow rate Q in the series. The other two-position valves 3b–3f in the series have flow rates of 2Q, 4Q, 8Q. 16Q and 32Q respectively. It is understood that the invention is not limited to a flow control valve having only one fine-control valve 4. When this benefits the control speed or the cost price of the flow control valve, it is very well possible that the control range Q to be bridged for the fine-control unit is provided by two or more fine-control valves.

It is also understood that in addition to the binary power series described, other digital combinations for the flow ratios of the successive two-position valves 3 in the series can be used as well, such as for instance the BCD and/or the Gray coding. It is also possible to have one or a number of values occur more frequently, for instance 1, 2, 4, 8, 16, 16 or 1, 2, 4, 4, 8, 16. With the true binary power series, each sum can be produced from one combination only. To other systems, this does not apply (redundant codes), but they have, in turn, other specific characteristics which may be advantageous in specific circumstances. The binary power series is the most efficient series, because it is non-redundant and hence yields the largest control range at a given number of two-position valves 3.

In the exemplary embodiment shown, the fine-control valve 4 is designed as a needle valve whose minimum flow rate is zero. However, it is also very well possible that for the design of the fine-control valve 4, a different type of continuously controllable valve is chosen. It is also possible that a fine-control valve is chosen whose minimum flow rate is greater than zero. In that case, the flow control valve cannot function as a shut-off valve, however the sensitivity to contamination by solid particles in the fluid and the wear of valve seats will be much slighter.

It is preferred that the two-position valves 3 be energized electropneumatically. However, it is understood that an electromagnetic, electromechanical or electrohydraulic drive of the two-position valves 3 is also possible. The advantage of electropneumatic energization, however, is that this may effect a very rapid change of valve position. This is of great importance for obtaining a flow control valve of a rapid switching characteristic.

The fine-control valve 4 can be energized electrically, mechanically, electromagnetically, electrohydraulically, pneumatically or by means of a linear stepping motor, while the electromagnetic drive of the fine-control valve 4, such as for instance a linear stepping motor, is preferred. With an electromechanical energization of the fine-control valve 4, a fairly large adjusting possibility and, accordingly, a large control range of the fine-control valve 4 can be realized at a relatively low cost price.

The exemplary embodiment shown comprises a central discharge line connection 2a which debouches into the outlet chamber 10 and serves for connecting to for instance a single fuel/air mixer of a combustion engine, the so-called single point type. For the sake of an alternative manner of connecting the flow control valve, it is also provided with a number of discharge line connections 2b which debouch into the outlet chamber 10 and serve for connecting directly, with or without the interposition of a pressure regulator, to for instance the injectors of a multi point injection system by means of which the fuel can separately be fed to the different cylinders of a combustion engine.

It is understood that the invention is not limited to the exemplary embodiment described, but that various modifications are possible within the framework of the invention.

What is claimed is:

1. A fuel supply system for a combustion engine comprising:

a fuel supply line;

at least one fuel discharge line by means of which the fuel can be fed to the combustion engine;

a flow control valve having a single housing with a supply line connection to which the fuel supply line is connected and at least one discharge line connection to which said fuel discharge line is connected;

at least one two-position valve supported in the housing and having an inlet and an outlet, the at least one two-position valve having one stable position to provide a minimum flow rate and having another stable position to provide a maximum flow rate, the inlet of the at least one two-position valve being in fluid communication with the supply line connection, and the outlet of the at least one two-position valve being in fluid communication with at least one discharge line connection; and at least one analogue fine-control valve supported in the housing and having an inlet and an outlet, the fine-control valve providing a flow control rate that is continuously or semi-continuously variable, the inlet of the at least one fine-control valve being in fluid communication with the supply line connection, and the outlet of the at least one fine-control valve being in fluid communication with the at least one discharge line connection;

wherein the flow control valve comprises a series of two-position valves, with the maximum flow rate of the successive two-position valves in the series doubling in each case, and the minimum flow rate of each two-position valve being zero;

wherein the flow control valve comprises one fine-control valve that provides a difference between a minimum and a maximum flow rate that is at least as great as the difference in flow rate between the minimum and the maximum flow rates of that two-position valve whose difference is smallest; and wherein the minimum flow rate of the fine-control valve is greater than zero.

2. A fuel supply system according to claim 1, characterized in that the supply line connection debouches into an inlet chamber into which the inlet of the or each two-position valve and the inlet of the or each fine-control valve debouch, the or each discharge line connection being connected to an outlet chamber to which the outlet of the or each two-position valve and the outlet of the or each fine-control valve debouch.

3. A fuel supply system for a combustion engine comprising:

a fuel supply line;

at least one fuel discharge line by means of which the fuel can be fed to the combustion engine;

a flow control valve having a single housing with a supply line connection to which the fuel supply line is connected and at least one discharge line connection to which said fuel discharge line is connected;

at least one two-position valve supported in the housing and having an inlet and an outlet, the at least one two-position valve having one stable position to provide a minimum flow rate and having another stable position to provide a maximum flow rate, the inlet of the at least one two-position valve being in fluid communication with the supply line connection, and the outlet of the at least one two-position valve being in fluid communication with at least one discharge line connection; and at least one analogue fine-control valve supported in the housing and having an inlet and an outlet, the fine-control valve providing a flow control rate that is continuously or semi-continuously variable, the inlet of the at least one fine-control valve being in fluid communication with the supply line connection, and the outlet of the at least one fine-control valve being in fluid communication with the at least one discharge line connection;

wherein the flow control valve comprises a series of two-position valves, with the maximum flow rate of the successive two-position valves in the series doubling in each case, and the minimum flow rate of each two-position valve being zero; and wherein the minimum flow rate of the fine-control valve is greater than zero.

4. A fuel supply system according to claim 3, characterized in that the or each two-position valve is energized electropneumatically.

5. A fuel supply system according to claim 3, characterized in that the minimum flow rate of the fine-control valve is adjusted by a linear stepping motor.

6. A fuel supply system according to claim 3, characterized in that the fine-control valve is a needle valve, a regulating plunger or regulating slide.

7. A fuel supply system according to claim 3, characterized in that the supply line connection debouches into an inlet chamber into which the inlet of the or each two-position valve and the inlet of the or each fine-control valve debouch, the or each discharge line connection being connected to an outlet chamber to which the outlet of the or each two-position valve and the outlet of the or each fine-control valve debouch.

8. A fuel supply system of claim 3, wherein two or more of the fine control valves are supported in the housing.

9. A fuel supply system for a combustion engine comprising:

a fuel supply line;

at least one fuel discharge line by means of which the fuel can be fed to the combustion engine;

a flow control valve having a single housing with a supply line connection to which the fuel supply line is connected and at least one discharge line connection to which said fuel discharge line is connected;

at least one two-position valve supported in the housing and having an inlet and an outlet, the at least one two-position valve having one stable position to provide a minimum flow rate and having another stable position to provide a maximum flow rate, the inlet of the at least one two-position valve being in fluid communication with the supply line connection, and the outlet of the at least one two-position valve being in fluid communication with at least one discharge line connection; and at least one analogue fine-control valve supported in the housing and having an inlet and an outlet, the fine-control valve providing a flow control rate that is continuously or semi-continuously variable, the inlet of the at least one fine-control valve being in fluid communication with the supply line connection, and the outlet of the at least one fine-control valve being in fluid communication with the at least one discharge line connection;

wherein a maximum flow rate of a smallest of the two-position valves is defined as $Q_1$, and wherein the fine-control valve is characterized in that a control range of the fine-control valve is from $0.5Q_1$ to $1.5Q_1$.

10. A fuel supply system according to claim 9, characterized in that the flow control valve comprises a series of two-position valves, with the maximum flow rate of the successive two-position valves in the series doubling in each case, and the minimum flow rate of each two-position valve being zero.

11. A fuel supply system according to claim 9, characterized in that the supply line connection debouches into an inlet chamber into which the inlet of the or each two-position valve and the inlet of the or each fine-control valve debouch, the or each discharge line connection being connected to an outlet chamber to which the outlet of the or each two-position valve and the outlet of the or each fine-control valve debouch.

12. A fuel supply system according to claim 9, comprising a fuel/air mixer and having a single discharge line for connecting a said discharge connection of the single housing of the flow control valve to the fuel/air mixer.

13. A fuel supply system according to claim 9, further comprising:

a multi-point injection system having a plurality of injectors by means of which the fuel can be separately be fed to the different cylinders of the combustion engine;

a plurality of discharge lines;

a plurality of discharge connections on the single housing, each discharge line connecting a discharge connection with a corresponding injector.

14. A fuel supply system of claim 9 wherein a connection between injectors of the combustion engine and the flow control valve is direct.

* * * * *